Patented Dec. 14, 1943

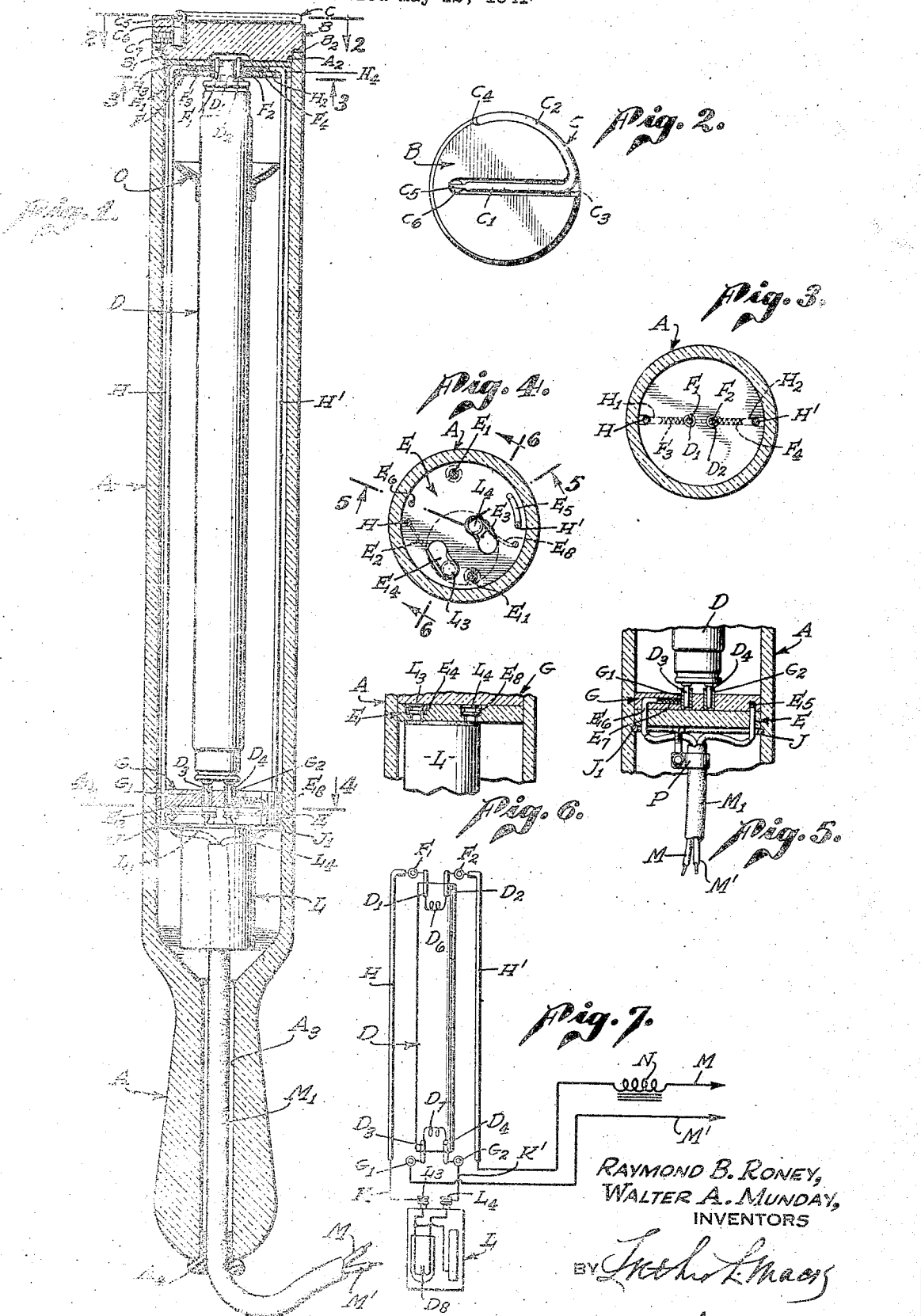

2,336,750

UNITED STATES PATENT OFFICE 2,336,750

PORTABLE LIGHT

Raymond B. Roney, South Pasadena, and Walter A. Munday, Glendale, Calif.

Application May 12, 1941, Serial No. 393,060

4 Claims. (Cl. 240—11.4)

This invention relates to and has for an object the provision of an improved type of portable lamp as distinguished from a conventional "flashlight" and embodying as salient characteristics: a light transmitting shell, jacket or envelope of tubular cross section—preferably formed of plastic material and either transparent or translucent—so that light may be diffused therefrom throughout its entire length and surface including an end or ends, and a lamp assembly unit removably insertible in the jacket and including a gas filled fluorescent lamp of sufficient length to provide a maximum of light.

The invention comprehends the provision of at least one removable light transmitting closure for an end of the jacket and a head, which is provided with electrical connections for the lamp terminals and between which and a head the lamp is fixedly held in position for use, together with suitable connections between the closure and head and means for electrically connecting the lamp with a source of energy.

It may be understood in the consideration of this invention that battery energized flashlights of conventional character are limited in their usefulness for several reasons, including a relatively short period of efficiency with a set of batteries, an insufficient volume of light for general use, and an improper centralization and diffusion of light especially when required for use in affording light for workmen in confined spaces and in the absence of daylight.

Our improved lamp, therefore, is designed primarily for use in dark closed spaces for providing a maximum of light for the benefit of workmen, such as for instance, for mechanical work within the compartments of airplanes, boilers, housings and other places where it is usually inconvenient to provide a necessary volume of light by ordinary means and where if the usual means were used, the light is inefficiently diffused and the lamp bulbs become easily broken and rendered useless.

It is an object, therefore, to provide a simple, efficient and economical portable lamp preferably arranged with a protective jacket or envelope of modern plastic material, within which is mounted a fluorescent lamp of elongated tubular form capable of diffusing light uniformly in all directions therearound without the glare caused by ordinary lamp bulbs and adapted to be connected with a source of electrical energy such as a service system with a transformer or choke coil interposed in the circuit as well as other necessary or desirable electrical devices commonly used in connection with such lamps.

A further object is to use such materials and to so mount the lamp in its jacket that neither the jacket nor the lamp will be damaged by jar, vibration or even the accidental dropping of the lamp upon hard surfaces or when in accidental collision with machinery, stationary obstacles or other things.

Another object is to provide means associated with the jacket whereby the lamp may be suspended for use from any suitable support. Other objects may appear as the description progresses.

We have shown a preferred embodiment of our invention in the accompanying drawing, subject to modification, within the scope of the appended claims, without departing from the spirit of our invention.

In said drawing:

Fig. 1 is a longitudinal section of our improved lamp on line 1—1 of Fig. 3;

Fig. 2 is a view of the same as seen on line 2—2 of Fig. 1;

Fig. 3 is a cross sectional view of the same on line 3—3 of Fig. 1;

Fig. 4 is a cross sectional view on line 4—4 of Fig. 1;

Fig. 5 is a cross sectional view on line 5—5 of Fig. 4;

Fig. 6 is a cross sectional view on line 6—6 of Fig. 4; and

Fig. 7 is a circuit diagram of the lamp and its connections.

Briefly described, the invention includes a tubular jacket A formed of plastic material which is either transparent or translucent throughout its entire length and has a handle portion $A_1$ either integral therewith or attached thereto in a suitable manner. The outer end of the jacket is preferably open and internally threaded at $A_2$ to detachably receive an end closure B which has a reduced externally threaded portion $B_1$ adapted to be screwed into the open end of the jacket, thereby providing a shoulder on closure B between which and the end of the jacket a suitable gasket $B_2$ is held for the purpose of rendering the jacket air tight, water tight and gas tight. Closure B has a hook C attached to the outer side of the closure and formed with a diametrical portion $C_1$ and an arcuate portion $C_2$ which are seated, respectively, in grooves $C_3$ and $C_4$ formed on the face of the closure so as to be normally held depressed within said grooves. Hook C is attached to closure B by means of a hinge $C_5$ which connects the hook with a pin $C_6$, said pin being either cast fixedly in the closure or removably held as by means of a set screw $C_7$.

Jacket A is adapted to protectively hold a standard fluorescent lamp tube D between the closure B and a head E, and to this end insulating or non-conducting discs F and G, respectively, are provided immediately inwardly of closure B and outwardly of head E, as shown in Fig. 1, between which the lamp D is supported unbreakably in the jacket. Disc F has sockets $F_1$ and $F_2$ held therein for electrical connection, respectively, with terminals $D_1$ and $D_2$ of lamp D, and disc G has similar sockets $G_1$ and $G_2$ for connection, respectively, with terminals $D_3$ and $D_4$ of the lamp. Sockets $F_1$ and $F_2$, respectively, are in electrical connection with conductor rods H and H' which have right angularly bent terminal portions $H_1$ and $H_2$ which seat in radial bores $H_3$ and $H_4$, respectively, formed in disc F and engage the outer extremities of resilient contacts $F_3$ and $F_4$ also seated in bores $H_3$ and $H_4$ and the inner extremities of which engage the sockets $F_1$ and $F_2$, respectively.

As shown in Figs. 1 and 5, the head E rests against and is held against more than normal movement into the jacket by means of a wire retainer J seated in an annular groove $J_1$ formed on the interior of the jacket. Thus, when the conductor rods H and H' are connected with the head E, as shown and hereinafter described, the entire lamp unit together with its connections may be removed from and inserted in the jacket as a unit for the purpose of replacement of the lamp or other parts or for other purposes when the closure B is first removed.

Head E and disc G are separately formed for facility of assembly but are held together as a unit when the electrical connections are established as by means of screws $E_1$. Rods H and H' extend through disc G and into head E, as shown in Fig. 1 and rod H is connected in head E with a spring contact $E_2$, the inner portion of which contact underlies an arcuate slot $E_4$ formed in the head. Rod H' connects in the head E by means of a portion $E_5$ directly with a lead out wire K while another lead out wire K' connects with terminal $D_4$ of lamp D through the medium of a portion $E_6$ in the head and resilient contact $E_7$ engaging the terminal socket $G_1$.

A starter such as is commonly used in connection with fluorescent lamps, as at L, is mounted on the lower side of head E by means of its terminals $L_2$ and $L_3$ which are annularly grooved at $L_4$ to receive and maintain contact with the spring contact $E_2$ and a similar contact $E_8$ which underlies an arcuate slot $E_3$ in the head and corresponds to the slot $E_4$, and the contact $E_8$ is electrically connected with the socket $G_2$ which receives lamp terminal $D_4$. Lead in wires M' and M are adapted for connection through the instrumentality of a suitable electrical plug for connection with a source of electricity and are respectively connected with terminal $D_3$ and rod H', as shown in Fig. 7. Usually a choke coil N is connected in series with the lamp circuit for the purpose of reducing the effective voltage in the lamp as required in such lamps.

The purpose of the starter L is well known and serves to initiate the operation of the lamp through the heating coils $D_6$ and $D_7$ and the thermostatic switch $D_8$ thereof, after which the lamp will be energized and will luminesce for as long a period as the lamp circuit is closed.

It will be noted that the starter L is frictionally locked in position on head E by reason of the terminals $L_3$ and $L_4$ being inserted in enlarged terminals of the arcuate slots $E_4$ and $E_3$ and then rotated until said terminals underlie the head, after the fashion of bayonet slot connections, thus rendering it possible to attach or remove the starter at will for any purpose.

The service wires M and M' are formed as a cord $M_1$ which is extended through a central passage $A_3$ in the handle and said passage is closed at the end of the handle, preferably, by means of a soft rubber plug $A_4$ which is adapted to compress around the cord $M_1$ and in the opening of the passage $A_3$ for the purpose of rendering the jacket proof against the entrance of air, water and gas. Hence, the lamp may be used under water or in gas filled compartments without danger of short circuiting the lamp or exploding gas in confined spaces.

It may be desirable in some cases, especially when light is needed ahead of the lamp to provide, as shown in Fig. 1, a reflector O within the jacket and preferably frictionally held in a selected position on the lamp tube L, it being understood that the closure B is of light transmitting material. Such a reflector may be of parabolic or other suitable form and may be adjustable longitudinally on the lamp D. Such a lamp is desirable as when lighting the interior of tubes or other shallow spaces and for various other purposes.

A particular advantage of our lamp consists in the provision of a portable lamp of maximum diffusive qualities and brilliancy which may be held by a workman or hung in confined spaces with assurance against breakage and wherein the light is radiated in all directions with equal intensity. The hook C is so formed and mounted on the closure B that when it is depressed into inoperative position as shown in Fig. 2, it will be held against accidental displacement and yet when extended upwardly by swinging it on its hinge $C_5$ it may be readily supported on any projecting part of machinery or fixture for supporting the lamp in the most advantageous position for workmen.

All of the elements of the lamp are preassembled for unitary insertion in and removal from the jacket A and when inserted for use are sealed and leakproof at the joints and openings and are protected against ordinary wear and tear by reason of the character of the materials of which the jacket is made and the cushioning of the lamp in its supports within the jacket. Thus, the accidental dropping of the lamp during its use will not ordinarily occasion any damage to the lamp proper, the jacket or any of the connections and parts.

All of the elements are so assembled and connected as to be readily capable of disassembly for any purpose, and the non-conducting jacket, in addition to being a protection for the lamp, also serves as an insulator. Hence, the lamp may not be accidentally short circuited. Preferably, a strain relief device P is provided beneath the head E which may consist merely of a clamp attached to the head and embracing the cord $M_1$ so that a pull on said cord will not disconnect any of the elements of the lamp.

The closure B not only serves to hold the parts of the lamp in assembled relation but also serves as a lens for directing rays of light longitudinally, and with increased efficiency when the reflector O is employed. A particular feature of the device consists in the connection of the opposed lamp terminals at but one end of the lamp with the service wires, and the further fact that there are no shadow producing parts which will interfere with the radiation of light at the end and entirely around the lamp. It will be noted that lamp D has a pair of terminals at each of its ends and that the outer terminals $F_1$ and $F_2$ engage the sockets $D_1$ and $D_2$, respectively, in the contact member F, while the terminals $D_3$ and $D_4$ engage the sockets $G_1$ and $G_2$ in the contact member G associated with head E. The rods H and H' initially are energized for completing the circuit of the heating coils $D_6$ and $D_7$ of the lamp through the then contacting points of the thermostatic switch $D_8$ at line voltage. However, as the coils $D_6$ and $D_7$ are sufficiently heated at the initial voltage, the circuit of the lamp is then completed through but one of said rods, as at H', as follows: the current will flow from the choke coil N, rod H' and thence through socket $F_2$ and terminal $D_2$, coil $D_6$, and by electronic conduction through the lamp D to coil $D_7$, and thence to terminal $G_1$ and outwardly through the line conductor M'. Thus the initial voltage is divided and the lamp fluoresces under a divided voltage equal to one-half of the original voltage.

A particular feature of this invention resides in the provision of the spring connected contacts at the opposite ends of the conductor rods H and H'. As shown in Fig. 1, the upper end of the rod H contacts the spring $F_3$, which is also in contact with lamp terminal socket $F_1$. In like manner the upper ends of rod H' contacts the spring $F_4$ which is in contact with lamp terminal socket $F_2$. The lower end of rod H is in permanent contact with terminal $L_3$ of the starting unit L and the lower end of rod H' is in permanent contact with line wire M.

As shown in Figs. 1, 4, and 5, the sockets $G_1$ and $G_2$ and the contact member G are similarly connected with the lamp terminals $D_3$ and $D_4$, respectively, and said sockets are connected in the circuit by the employment of springs as at $E_7$, similar to the spring contact members $F_3$ and $F_4$.

It may also be noted that the rods H and H', in addition to serving as electrical conductors, also serve to hold the heads D and E together so that the entire unit, when the closure B is removed, may be bodily inserted in and removed from the protective tube A. The handle portion of tube A may be omitted and a suitable closure for the lower end thereof and similar to or different from closure B may be attached to the tube in lieu of the handle.

What we claim, is:

1. A portable lamp comprising: a light transmitting tubular body, closures detachably supported on the ends of said body, and a lamp assembly bodily insertible in and removable from the body and including a fluorescent tubular lamp having pairs of terminals at each of its ends and sealed electrodes therein one of which is electrically connected with each pair of terminals, contact members having insulated bodies and metallic sockets attachable to the ends of the lamp for receiving said terminals, longitudinal conductors within said body connecting said members, spring contacts radially arranged in said contact members for electrically connecting terminal portions of said conductors and the associated sockets, and a starting switch carried by the innermost of said members and connected with a source of electricity and with the terminals of said lamp through said conductors and associated elements, for establishing a circuit through said conductors, said terminals and the electrodes of the lamp and thereafter for changing the circuit of the lamp to effect continued luminescence.

2. A portable lamp comprising: a tubular body of light transmitting material arranged to transmit light to an extent of 360 degrees therearound, a lamp assembly bodily insertible in and removable from the body, means adjacent the inner end of the body for limiting the inward movement of the assembly into the body, a closure on the outer end of the body for confining the assembly within the body for operation, said assembly including a fluorescent lamp of tubular cross section and having pairs of terminals at each end thereof, contact members detachably held on the ends of the lamp and having metal sockets engaging the lamp terminals, metallic conductors connecting said contact members for holding said contact members and said lamp in assembled relation, radially disposed coiled spring contacts carried by said contact members for electrically connecting said conductors with said sockets for completing the circuit of said lamp, and starting means connected with a source of electricity for regulating the operation of the lamp, said conductor having frictional and detachable connection with said contact members.

3. A portable light of the character described comprising a fluorescent lamp having pairs of contact pins at each end thereof, disk-shaped contact socket members detachably connected, one to each pair of contact pins of said lamp, a starting mechanism contained within a housing as a unit and having a pair of contact terminals projecting therefrom, said housing being detachably connected through said contact terminals to one of said contact sockets for the lamp on the side opposite the lamp contact pins, circuits including said lamp socket members and the contact terminals of said starting mechanism, and a tubular light transmitting housing engaging the side walls of said disk-shaped socket members and enclosing said socket members and starting mechanism housing.

4. A portable light of the character described comprising a light transmitting elongated tubular housing, a lamp assembly bodily insertible in and removable through one end of said housing, said lamp assembly including a fluorescent lamp having pairs of contact pins at each end thereof and socket members detachably connected, one to each pair of contact pins of said lamp, a starting mechanism contained within a housing as a unit and having a pair of contact terminals projecting therefrom, said housing being supported by and detachably connected through said contact terminals to one of said contact sockets for the lamp on the side opposite the lamp contact pins, circuits including said lamp socket members and the contact terminals of said starting mechanism, said contact sockets having portions engaging the inner wall of said tubular housing to support the lamp substantially along the longitudinal axis of said housing, and a closure element detachably connected to the end of the housing through which the lamp assembly is insertible in and removable therefrom.

RAYMOND B. RONEY.
WALTER A. MUNDAY.